United States Patent
Disatnik et al.

(10) Patent No.: US 7,809,214 B2
(45) Date of Patent: Oct. 5, 2010

(54) DEVICE AND A METHOD FOR IDENTIFYING MOVEMENT PATTERNS

(75) Inventors: Israel Disatnik, Bat-Hefer (IL); Eli Ben-Ami, Herzlla (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1051 days.

(21) Appl. No.: 11/503,116

(22) Filed: Aug. 14, 2006

(65) Prior Publication Data

US 2007/0041058 A1     Feb. 22, 2007

Related U.S. Application Data

(60) Provisional application No. 60/709,794, filed on Aug. 22, 2005.

(51) Int. Cl.
*G06K 9/22* (2006.01)
(52) U.S. Cl. ............... 382/313; 382/209; 382/219; 382/275
(58) Field of Classification Search ............ 382/274, 382/275, 313
See application file for complete search history.

(56) References Cited

U.S. PATENT DOCUMENTS

| | | | |
|---|---|---|---|
| 5,387,947 A | | 2/1995 | Shin |
| 5,473,368 A * | | 12/1995 | Hart ............... 348/155 |
| 5,742,705 A | | 4/1998 | Parthasarathy et al. |
| 6,233,368 B1 * | | 5/2001 | Badyal et al. ........... 382/307 |
| 6,418,166 B1 | | 7/2002 | Wu et al. |
| 6,535,244 B1 | | 3/2003 | Lee et al. |
| 6,594,397 B1 | | 7/2003 | Hu |
| 7,328,996 B2 * | | 2/2008 | Walling ............... 347/109 |
| 7,336,388 B2 * | | 2/2008 | Breton ............... 358/1.18 |
| 7,489,255 B2 * | | 2/2009 | Sonoura ............... 340/825.49 |
| 2002/0080239 A1 | | 6/2002 | Ikeda et al. |
| 2002/0198030 A1 | | 12/2002 | Shima |
| 2003/0231856 A1 | | 12/2003 | Ikeda |
| 2005/0116045 A1 | | 6/2005 | Chang |
| 2005/0216867 A1 | | 9/2005 | Marvit et al. |
| 2005/0276333 A1 | | 12/2005 | Park |
| 2005/0285947 A1 | | 12/2005 | Grindstaff et al. |
| 2006/0067589 A1 | | 3/2006 | Perlmutter et al. |

(Continued)

FOREIGN PATENT DOCUMENTS

CN         1187257         7/1998

(Continued)

OTHER PUBLICATIONS

Office Action Dated Jul. 10, 2009 From the State Intellectual Property Office of the People's Republic of China Re: Application No. 2006800306580 and Its Translation Into English. e-mail pdf-24.9.09.

(Continued)

*Primary Examiner*—Yosef Kassa

(57) ABSTRACT

A device for converting digital images taken along a predefined movement pattern into a control signal. The device comprises an image input device having a connection to a image sensor. The image input device is adapted to receive the digital images captured during the displacement of the image sensor and determine whether motion measured therein corresponds to any prestored movement pattern, that is to say to a predefined gesture. The device further comprises a movement pattern converter to convert the recognized pattern into the control signal.

37 Claims, 12 Drawing Sheets

U.S. PATENT DOCUMENTS

| | | | |
|---|---|---|---|
| 2006/0177103 | A1 | 8/2006 | Hildreth |
| 2006/0190750 | A1 | 8/2006 | Maggi et al. |
| 2006/0285587 | A1 | 12/2006 | Luo et al. |
| 2007/0067745 | A1 | 3/2007 | Choi et al. |
| 2007/0095588 | A1 | 5/2007 | Mattes et al. |

FOREIGN PATENT DOCUMENTS

| | | |
|---|---|---|
| CN | 1214595 | 4/1999 |
| CN | 1303496 | 11/2001 |
| CN | 1571560 | 1/2005 |
| GB | 2330269 | 4/1999 |
| JP | 2003-008693 | 1/2003 |
| KR | 10-2004-0100122 | 12/2004 |
| KR | 10-2005-0013362 | 2/2005 |
| WO | WO 96/39677 | 12/1996 |
| WO | WO 99/60467 | 11/1999 |
| WO | WO 2004/041611 | 5/2004 |

OTHER PUBLICATIONS

Official Action Dated Oct. 21, 2009 From the US Patent and Trademark Office Re.: U.S. Appl. No. 11/503,119.

Official Action Dated Sep. 30, 2009 From the US Patent and Trademark Re.: U.S. Appl. No. 11/503,193.

Summary in English Dated Sep. 24, 2009 of the Search/Examination of Jul. 10, 2009 From the Korean Patent Office Re.: U.S. Appl. No. 11/503,119.

Office Action Dated Feb. 12, 2010 From the State Intellectual Property Office of the People's Republic of China Re.: Application No. 2006800307850. In Chinese Only!.

Office Action Dated Oct. 30, 2009 From the State Intellectual Property Office of the People's Republic of China Re.: Application No. 2006800307545 and its Translation Into English.

Response Dated Dec. 16, 2009 to Official Action of Sep. 30, 2009 From the US Patent and Trademark Office Re.: U.S. Appl. No. 11/503,193.

Response Dated Jan. 21, 2010 to Official Action of Oct. 21, 2009 From the US Patent and Trademark Office Re.: U.S. Appl. No. 11/503,119.

Zhen "Research on Motion Compensation Algorithm and Sprite Coding of MPEG-4", Dissertation for the Degree of Master of Science, Thesis Submitted to the Tsinghua University, China. Abstract in English.

Official Action Dated Apr. 7, 2010 From the US Patent and Trademark Office Re.: U.S. Appl. No. 11/503,119.

Official Action Dated Jun. 9, 2010 From the US Patent and Trademark Re.: U.S. Appl.No. 11/503,193.

* cited by examiner

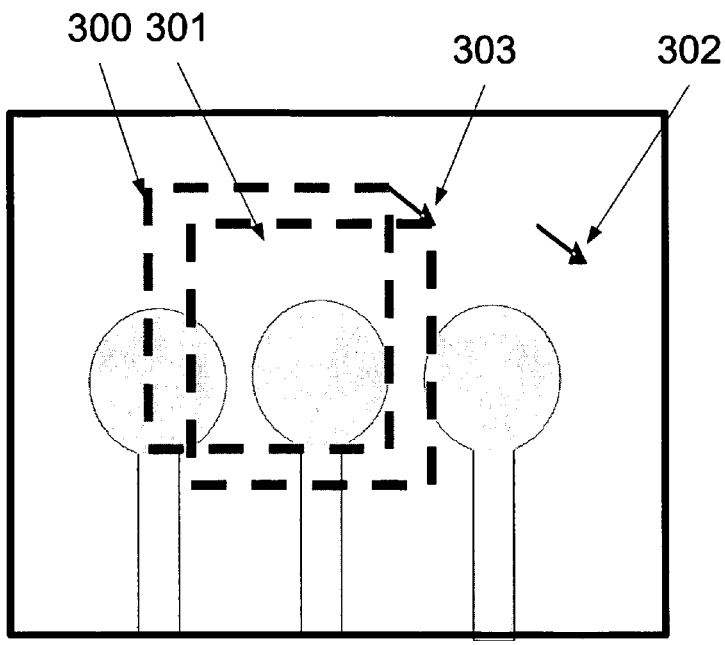
Fig. 4A
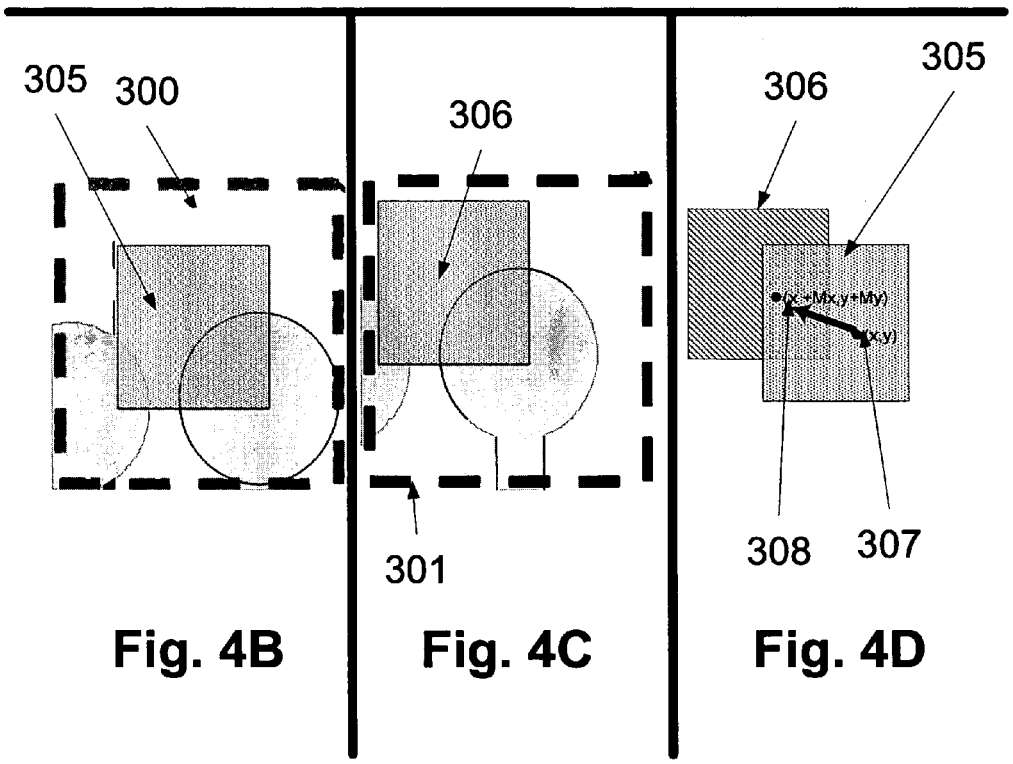
Fig. 4B | Fig. 4C | Fig. 4D

| Database Segment | Compared Segment | Dot Product |
|---|---|---|
| A1 | C1 | -0.9978 |
| A2 | C2 | -0.8437 |
| A3 | C3 | -0.6613 |
| A4 | C4 | -0.3066 |
| A5 | C5 | 0.6016 |
| A6 | C6 | 0.9824 |
| A7 | C7 | 0.1066 |
| A8 | C8 | -0.4143 |
| A9 | C9 | 0.9928 |
| A10 | C10 | 0.8495 |
| A11 | C11 | -0.1355 |
| A12 | C12 | -0.8768 |
| A13 | C13 | -0.4205 |
| A14 | C14 | 0.2745 |
| A15 | C15 | 0.9807 |
| A16 | C16 | 0.6528 |
| Match Score C vs. A | | 0.7844 |

704

| Database Segment | Compared Segment | Dot Product |
|---|---|---|
| B1 | C1 | 0.9873 |
| B2 | C2 | 0.9973 |
| B3 | C3 | 1.0000 |
| B4 | C4 | 0.9937 |
| B5 | C5 | 0.9860 |
| B6 | C6 | 0.9998 |
| B7 | C7 | 0.8759 |
| B8 | C8 | -0.8614 |
| B9 | C9 | 0.9995 |
| B10 | C10 | 0.9978 |
| B11 | C11 | 0.7505 |
| B12 | C12 | 0.9322 |
| B13 | C13 | 0.9950 |
| B14 | C14 | 0.9189 |
| B15 | C15 | 0.9731 |
| B16 | C16 | 0.8996 |
| Match Score C vs. B | | 13.4452 |

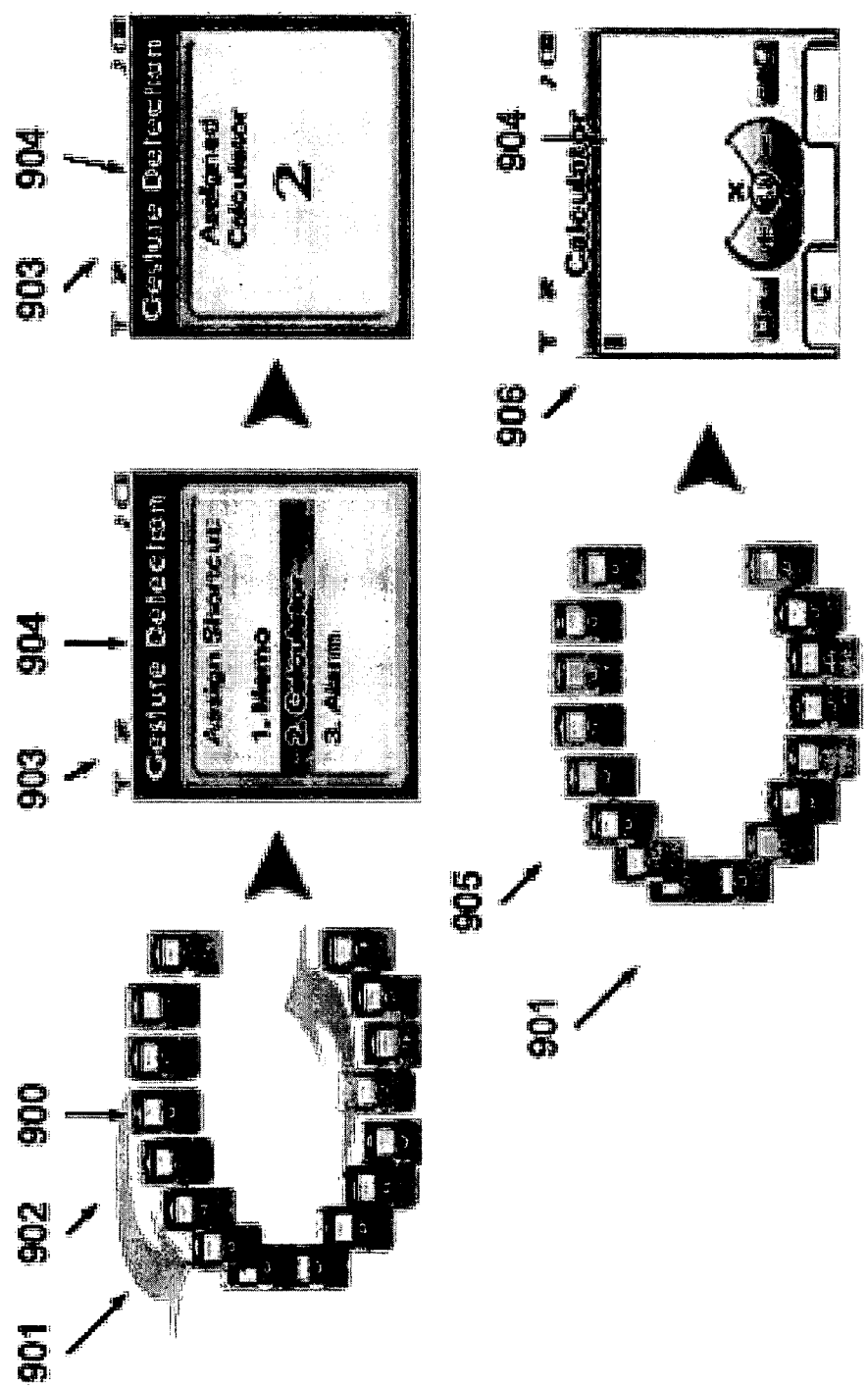

DEVICE AND A METHOD FOR IDENTIFYING MOVEMENT PATTERNS

RELATED APPLICATIONS

The present application claims priority from Provisional U.S. patent application No. 60/709,794, filed on Aug. 22, 2005, the contents of which are incorporated herein by reference in their entirety.

FIELD AND BACKGROUND OF THE INVENTION

The present invention relates to a device and a method for converting movement patterns to control signals and, more particularly but not exclusively, to a device and a method for converting movement patterns to control signals using image processing.

The rapid miniaturization of complex electronic circuits and the emergence of high-resolution display devices have vastly increased the number and variety of portable processor based devices. Such portable processor based devices include handheld computers, mobile telephones, pagers and other portable communication and computing solutions. Moreover, the processing power, the data storage capability, the communication speed, and the battery life of portable processor based devices are continuing to develop at an accelerated pace.

Each one of the aforementioned portable processor based devices usually integrates a man machine interface (MMI) that allows a user to control its functioning. However, the MMI has to be adjusted to the small size of the portable autonomous device. The traditional MMI in such portable processor based devices is a miniaturized keyboard or a keypad which allows a user to input data having textual representation such as telephone number, a contact name, word processor content, etc.

Another MMI, which is typically used to input textual data in personal digital assistants (PDAs) is a touch screen. Such a device usually integrates a pen-like pointing device often stored next to or on the PDA. In use, the pen-like pointing device is applied to a touch screen on the PDA to enable a user to make choices and interact with the PDA device. High resolution LCD touch screens may be used in mobile phones and portable processor based devices. To determine where a display screen is touched, capacitive and resistive touch-sensitive layers are commonly used. They are based on transparent conductors such as indium-tin oxide films. However, the disadvantages in using such MMIs are their high price and limited transparency which reduces the picture quality, particularly of modern, high resolution LCD displays.

The aforementioned MMIs allow a user to control different functions of the related device by, inter alia, inputting a simple, short sign such as a character or pressing on a desired icon or letter on a simulated or real keyboard. Since each MMI is adjusted to the size of a miniaturized device, a user may have to concentrate in order to find the related small switch or to scribble the desired character using the pen-like pointing device. Furthermore, there is a limited ability to configure the MMI so that one action or key press produces a result or event due to physical constraints.

The rapid miniaturization of complex electronic circuits has recently led to the integration of image sensors into the portable processor based devices. PDAs, mobile phones, and laptops integrate cameras which are used to capture still and video images. One of the reasons for the prevalence of such products is the price and size reduction of image sensors such as complementary metal oxide semiconductor (CMOS) image sensors or charge coupled portable processor based devices (CCDs).

The integration of image sensors opens up additional possibilities to allow users to interface with portable processor based devices. Known camera integrated mobile phones, for example, use a motion interface engine which facilitates control of the device by, for example, inputting directional or movement instructions into the device via the image sensor to control functions such as scrolling through menus. However, these applications can only be used for navigation through different menus of the device or for controlling the display of an object viewer such as a cursor. The directional instructions cannot be used as a basis for inputting characters or other predefined signs which are usually input using a keypad or a keyboard. Moreover, inputs which are comprised of a sequence of directional instructions cannot be entered as a single instruction.

There is thus a widely recognized need for, and it would be highly advantageous to have, a device and a method for an MMI devoid of the above limitations.

SUMMARY OF THE INVENTION

According to one aspect of the present invention there is provided a device having a connection to an image sensor for identifying predefined complex self-motions. The device comprises a motion vector detection module adapted to receive digital images captured during a displacement of the image sensor. The motion vector detection module is configured for generating a current motion vector of the image sensor according to the digital images. The device further comprises an amalgamating module which is adapted to receive the current motion vector. The amalgamating is configured to amalgamate the current motion vector with a sequence of consecutive motion vectors during the displacement. The device further comprises a movement pattern repository adapted to store a pattern sample records, each represents a predefined movement pattern, and a movement pattern matching module which is adapted to match between one of the pattern sample records and the sequence of consecutive motion vectors.

Preferably, the predefined movement pattern is a non-linear movement pattern.

Preferably, the movement pattern matching module is configured to determine according to the match whether the digital images being taken approximately along respective predefined movement pattern.

Preferably, the amalgamating module is adapted to be used for adding a new record to the pattern sample records, the new record being generated according to the digital images.

Preferably, the device further comprises a user interface, the user interface being configured to allow a user to initiate and terminate the capturing of the digital images.

Preferably, the device further comprises an output device adapted to output a control signal.

More preferably, the control signal represents at least one of the following group: a character for textual input, the initiating of at least one function of the image input device, a security signature having a planar pattern, a security signature having a spatial pattern, and the termination of at least one function of the image input device.

More preferably, each one of the pattern sample records comprises an array of motion vectors.

More preferably, the amalgamating module is adapted to convert the sequence of consecutive motion vectors to a normalized sequence of consecutive normalized motion vectors, each normalized motion vector of the normalized sequence and each vector of the array of motion vectors have a uniform length.

Preferably, the device is one of the following group: a mobile phone, a Personal Digital Assistant (PDA), and a laptop.

Preferably, the image sensor is one member of the following group: a complementary metal oxide semiconductor (CMOS) sensor, and a charged coupled portable autonomous device (CCD) sensor.

Preferably, the digital images are represented by one member of the group consisting of: Hue-Saturation-Value (HSV) color coordinates, CIE L*a*b* (CIELAB) color coordinates, YCbCr color coordinates, and Red- Green-Blue (RGB) color coordinates.

Preferably, the connection is configured to allow a user to maneuver the image sensor separately from the device.

More preferably, the connection comprises at least one of the following connections: an RS-232 connection, an Ethernet connection, an Universal Serial Bus (USB) connection, a cellular transceiver connection, a Firewire connection, an USB2 connection, a Bluetooth® connection, and an IR connection.

Preferably, the image sensor is firmly coupled to the device.

More preferably the device further comprises a communication interface module, the communication interface module being adapted to transmit the control signal to a remotely located device.

According to another aspect of the present invention there is provided a device for converting digital images taken during the displacement of an image sensor to a control signal. The device comprises an image input device having a connection to a image sensor. The image input device adapted to receive the digital images captured during the displacement of the image sensor. The device further comprises a repository of predefined movement patterns and a movement pattern converter, associated with the repository and the image input device and adapted to convert the digital images to the control signal according to a match between the displacement and one of the predefined movement patterns.

According to another aspect of the present invention there is provided a method for identifying planar self movement patterns. The method comprises the following steps: a) receiving digital images captured during the displacement of an image sensor integrated device, b) identifying a sequence of movement data according to the digital images, and c) matching the sequence of movement data with a stored predefined movement pattern.

Preferably, the method further comprises a step c) of generating a control signal according to the match.

Preferably, the matching of step (c) is performed by matching the sequence of movement data with a pattern sample records, each record of the pattern sample records being associated with a different predefined movement pattern.

Preferably, the predefined movement pattern is one of the following group: a character, a symbol, a predefined outline of a hand gesture, a security signature having a pattern, and a security signature having a spatial pattern.

Preferably, the movement data comprises information regarding the movement of the image sensor integrated device during consecutive time segments.

Preferably, the sequence of movement data is an array of motion vectors.

More preferably, each record of the pattern samples comprises an array of motion vectors, wherein during the matching each motion vector of the sequence of movement data is matched with a corresponding motion vector of the pattern sample records.

More preferably, during the matching the motion vectors of the sequence of movement data are segmented according to the number of motion vectors stored in the matched predefined movement pattern.

More preferably the method further comprises a step between the step (a) and the step (b) of normalizing the sequence of movement data by dividing each one of the array of motion vectors by its length.

More preferably the method further comprises a step of dividing the sequence of movement data into a predefined number of segments of equal length, each one of the segments representing directional data of a corresponding digital image of the sequence.

Preferably, the method further comprises a step between the step (a) and the step (b) of converting the color coordinates of pixels of the digital images to grayscale color coordinates.

More preferably the method further comprises a step of transmitting the control signal to an application of the device.

More preferably, the application is hosted on the device.

More preferably, the application is hosted on a remotely located device.

Preferably, the method further comprises a step before the step (a) of storing at least one predefined movement pattern.

More preferably the storing comprises a step of receiving digital images captured during the displacement of the image sensor integrated device approximately along one of the at least one predefined movement pattern.

More preferably the storing comprises a step of receiving the at least one predefined movement pattern from an external source.

More preferably the external source is a personal computer.

According to another aspect of the present invention there is provided a mobile phone having an image sensor for identifying predefined complex self-motions. The mobile phone comprises a motion vector detection module which is adapted to receive digital images captured during a displacement of the image sensor, the motion vector detection module being configured for generating a current motion vector of the image sensor according to the digital images and a movement pattern repository for storing a plurality of user defined movement pattern. The mobile phone further comprises a movement pattern matching module adapted to match between one of the plurality of user defined movement pattern records and the sequence of consecutive motion vectors.

Preferably, the movement pattern is predefined by a user of the mobile phone.

According to another aspect of the present invention there is provided a method for performing a function of a mobile handheld device. The method comprises a) receiving digital images captured during the displacement of the mobile handheld device approximately along a user defined movement pattern, b) identifying the user defined movement pattern according to the digital images, and c) performing the function according to the user defined movement pattern.

Preferably, the method further comprises a step between step b) and step c) of matching the user defined movement pattern with a stored predefined movement pattern, wherein the performing of step c) is done according to the match.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and device of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4A is graphical representation of two consecutive digital images which are captured by a conversion device, according to a preferred embodiment of the present invention;

FIG. 4B is a graphical representation of the first of the two digital images of FIG. 4A;

FIG. 4C is a graphical representation of the second of the two digital images of FIG. 4A;

FIG. 4D is an exemplary schematic illustration of the deviation between the positioning of pixels of a matching area at the first digital image and at the second digital image of FIG. 4A;

FIG. 8B depicts two tables, each comprising similarity level values of different pattern sample records in relation to the movement pattern shown in FIG. 8A; and FIG. 9 depicts a mobile phone and some of its displays during the recording of movement pattern into the pattern sample repository and during the usage of the recorded movement pattern, according to a preferred embodiment of the present invention.

DESCRIPTION OF THE PREFERRED EMBODIMENTS

Figure 1:
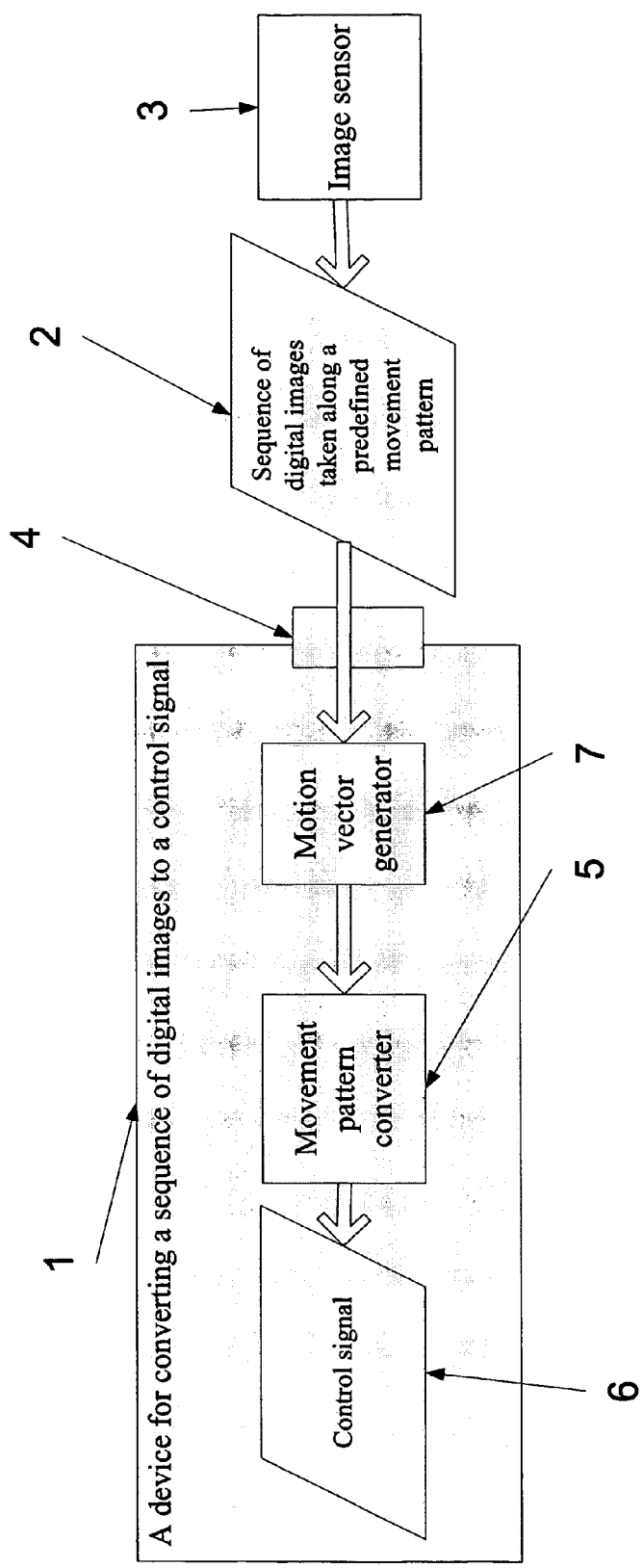
FIG. 1 is a schematic illustration of a device for converting a sequence of digital images taken along a path into a control signal, according to a preferred embodiment of present invention.

The present embodiments comprise a device and a method for converting digital images into a corresponding control signal whenever a predefined movement path is identified.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One embodiment of the present invention is a device for converting a sequence of current digital images into a control signal. The device comprises an image input conversion device having a connection to an image sensor. The image input conversion device is adapted to receive the sequence of digital images captured during the displacement of the image sensor to identify any movement patterns. The conversion device further comprises a movement pattern converter which is adapted to convert the identified movement pattern into a control signal.

Another embodiment of the present invention is a method for converting movement patterns to control signals. The method comprises several steps. During the first step a sequence of, digital images are captured during the displacement of an image sensor integrated device. The device may be displaced approximately according to a gesture, or a random movement. The sequence of digital images which is captured during the movement of the image sensor integrated device is analyzed to identify a movement pattern which has been carried out. The identified predefined movement pattern is matched with one of a number of prestored gesture records; each record comprising a sample of a different predefined movement pattern. After a match has been found, a corresponding control signal is generated.

A conversion device may be understood as any processor based device that integrates or is connected to an image sensor such as, inter alia, a PDA, a mobile phone, a wireless handheld device, or a laptop.

A control signal may be understood as a stimulus, an input, or a sign which initiates a certain action, such as a signal or interference, that enters a functional unit, such as a telecommunications device, a processor, or a computer program.

A movement pattern or gesture may be understood as any movement of an object along a track that approximately or accurately follows an outline of a certain shape such as the shape of a character, the shape of a sign, a linear shape, a spatial shape, or the shape on an object. A movement pattern may also be understood as any movement of an object along a track of a known hand gesture, or a typical movement of a limb during the performance of a known activity.

Reference is now made to FIG. 1 which depicts an exemplary device 1 for converting a sequence of digital images taken as the camera moves in order to determine whether the camera has been moved along a predefined movement pattern or gesture, according to an embodiment of the present invention. The conversion device 1 is adapted to receive a sequence of digital images 2 from an image sensor 3 via a designated image input module 4. Preferably, the image sensor is a CMOS sensor or a CCD sensor. Preferably, the image sensor 3 is coupled to the conversion device. In such an embodiment the sequence of digital images is taken during the displacement of the conversion device along a predefined movement pattern. A mobile phone that integrates a camera is an example of such an embodiment.

In another embodiment of the present invention, the image input conversion device is connected to the image sensor via a wireless connection or an extension cable. In such an embodiment the sequence of digital images are taken during the displacement of the image sensor along a candidate for a predefined movement pattern, separate from the conversion device. An example of such an embodiment is a mobile phone or a PDA that communicates with a separate unit that comprises an image sensor coupled to a Bluetooth® transmitter. In such an embodiment the sequence of digital images are transferred to the conversion device via an adjusted wireless connection. Preferably, the separate unit has a penlike or a ringlike shape in order to facilitate its displacement by the user.

Preferably, the conversion device comprises a user interface which is configured to allow a user to initiate and terminate the capturing of the sequence of digital images. In a mobile phone, for example, the capturing may be initiated via a simple set of commands issued by pressing designated keys on the keypad or by pressing a designated button on the housing of the mobile phone. In order to initiate and terminate the capturing of the sequence of digital images, the user may press and hold a button or, alternatively, he may press a button once to initiate the capturing and press the button a second time to terminate the capturing. That is to say the user defines the beginning and the end of the gesture.

The sequence of digital images 2 are transferred to a motion vector generator 7. The successive sequence of digital images 2 may or may not be taken along a predefined movement pattern, as described below. The motion vector generator 7 is used to convert the digital images to a sequence of motion vectors which are later gathered and converted to a control signal 6 by the movement pattern convertor 5, as described below. The conversion enables a user of the conversion device 1 to control different functions of the conversion device 1 or a related device by moving the image sensor 3 along a predefined movement pattern. The conversion further enables the user of the conversion device to input, in the same manner, signals which represent different characters or markings which have been previously defined. The control signal 6 is transferred to an associated application, as described below.

Figure 2:
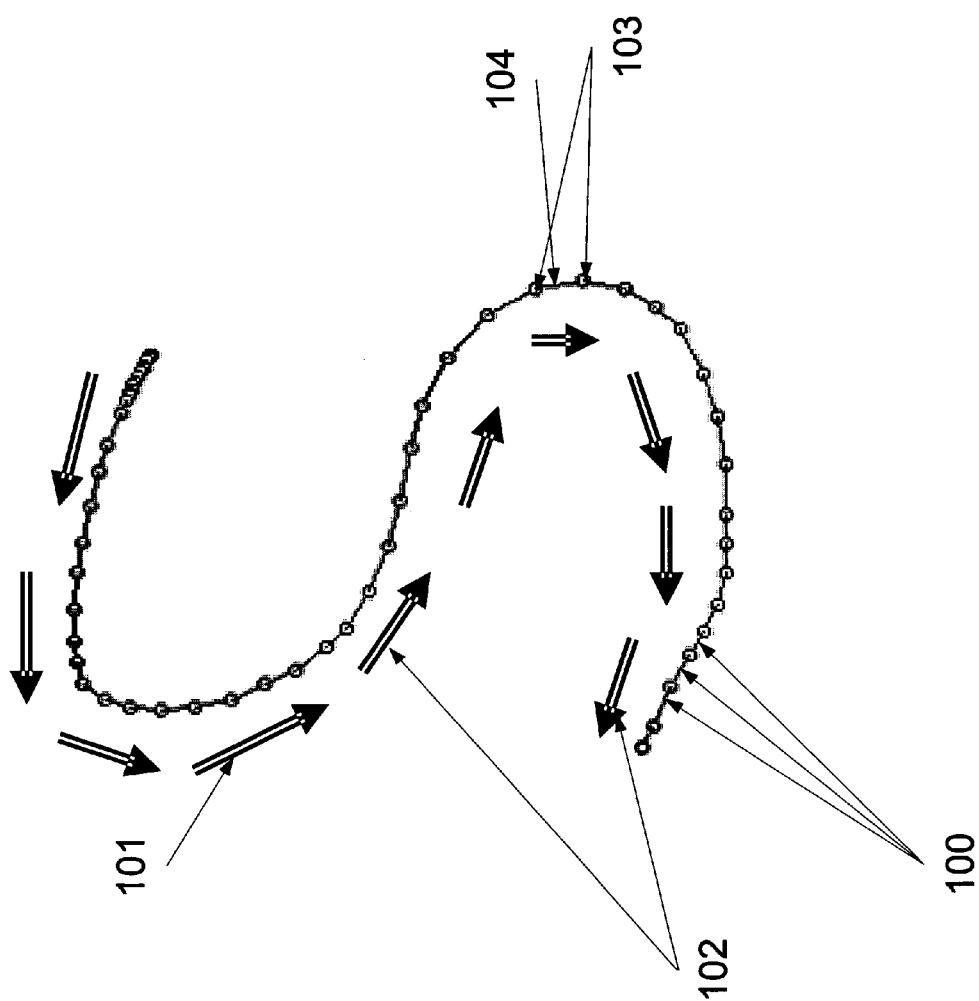
FIG. 2 is an exemplary graphical representation of a set of consecutive motion vectors which are assembled to form a movement pattern, according to a preferred embodiment of present invention.

Reference is now made to FIG. 2 which is a graphical representation of a set of consecutive motion vectors 100 which are assembled to form a movement pattern 101. Each motion vector 100 of the movement pattern 101 represents the motion of the conversion device during a certain time segment.

As described above, the motion vector generator 7 and movement pattern converter 5 are used to convert the sequential digital images 2 to a control signal 6. Preferably, conversion device 1 is configured to convert a number of different predefined movement patterns to different respective control signals. In such an embodiment, the user maneuvers the conversion device 1 approximately along a track 102 that follows the outline of a predefined movement pattern in order to transmit information to the movement pattern converter 5 regarding a certain associated sequence of control signals. Preferably, in order to identify the predefined movement pattern and to associate it with a certain control signal, the motion vector generator 7 utilizes image processing.

Figure 3:
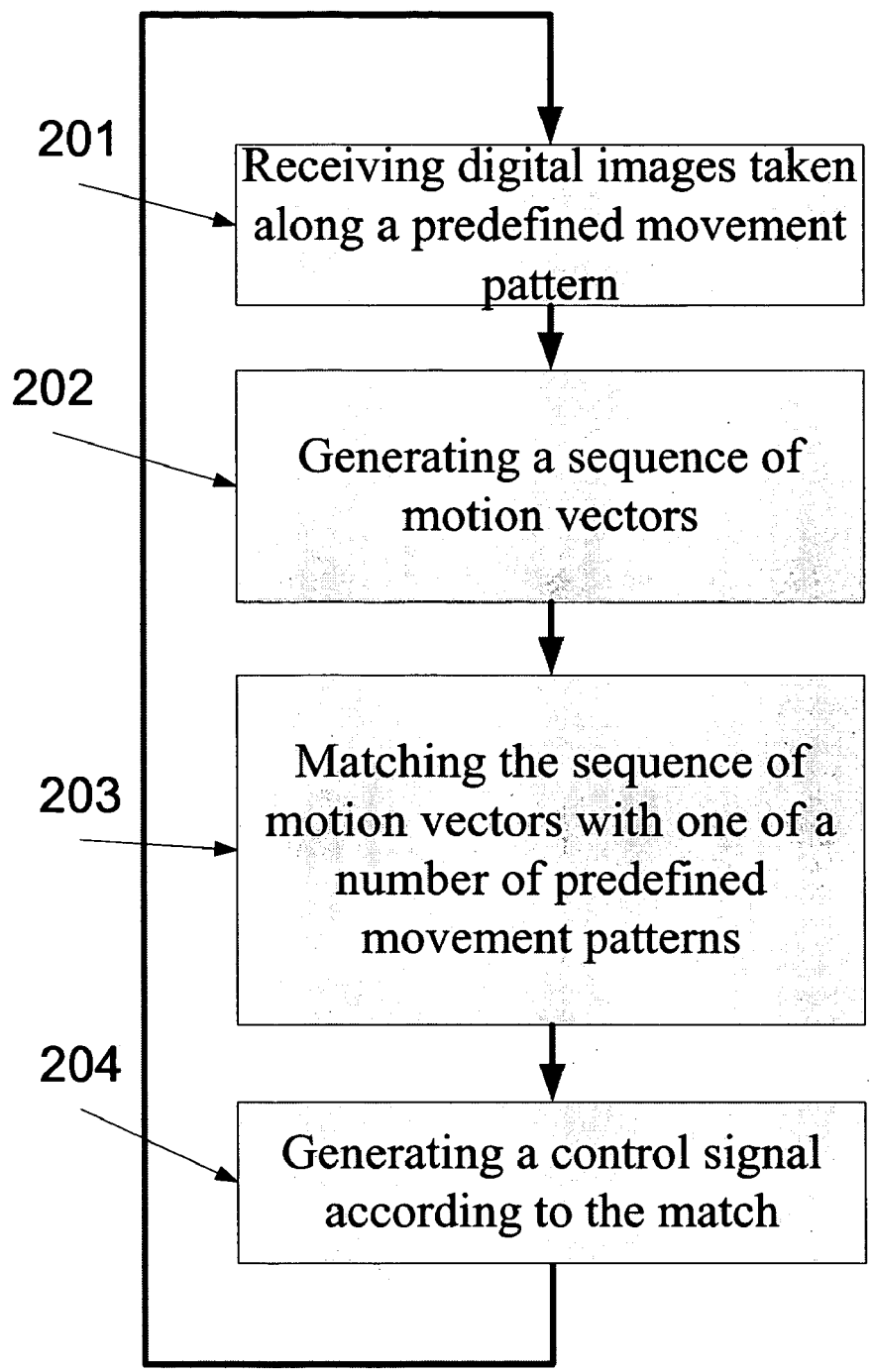
FIG. 3 is a simplified flowchart diagram of a four-step process for converting a sequence of digital images to a control signal, according to a preferred embodiment of the present invention.

Reference is now made to FIG. 3, which is a flowchart that illustrates a four-step process for converting a sequential digital images to a control signal, according to a preferred embodiment of the present invention. During the first step, 201, the movement pattern converter receives sequential digital images. In one embodiment of the present invention, each one of the digital images comprises a plurality of color pixels, each pixel comprising color information. The color information of each pixel is used for the image processing.

During step 202, a sequence of motion vectors is generated by the movement pattern converter. As described above, the sequential digital images are taken along a predefined movement pattern. In order to identify the predefined movement pattern during which the sequential digital images have been taken, the motion vectors that comprise the predefined movement pattern have to be separately calculated. Preferably, each of the sequence of motion vectors is calculated based on the differences between two consecutive digital images by the motion vector generator.

Reference is now made to FIG. 4A, 4B, 4C and 4D which depict an area which is partly captured and depicted by two consecutive digital images 300, 301. FIG. 4A depicts two consecutive digital images which are used for calculating one of the motion vectors used by the conversion device to determine the movement pattern, as described above. The motion vector of the conversion device 302 is estimated based on a deviation between the positioning of a first digital image 300 and a second digital image 301. FIG. 4A depicts a first digital image 300 and a second digital image 301 which are captured by a conversion device having a movement direction as shown at numeral 303. Since the digital images belong to the same sequence of digital images, they have the same dimensions and can be referred to using the same coordinate system. Preferably, a coordinate system with an origin at the lower-left hand corner of the frames is used.

In order to calculate the deviation between the positioning of the digital images 300 and 301, a reference area depicting a similar pattern or area is preferably identified in both images. FIG. 4B depicts the first digital image 300 and a corresponding reference area 305. FIG. 4C depicts the second digital image 301 and a corresponding reference area 306. Reference areas 305 and 306 depict the same portion of the image which was captured in images 300 and 301.

Preferably, in order to identify an area of the second digital image 301 which matches an area of the first digital image 300, a block matching algorithm is used. In one embodiment of the present invention, an exemplary sum of absolute differences (SAD) algorithm is used to choose a matching area within the boundaries of digital image 301. The SAD process is used to quantify the similarity between a certain area of the first digital image and different matching area candidates within the second digital image 301. The outcome of quantification is used to determine the matching area. Other algorithms which have developed to reduce the computational complexity of the block matching process may be used. For example, a partial sum of absolute difference (PSAD), a mean of absolute difference (MAD), a three step search (TSS), a modified motion estimation algorithm (MMEA), or an independent orthogonal search algorithm (IOSA) may be used to choose a matching area of the second digital image. The SAD, PSAD, TSS, MMEA, and IOSA algorithms are generally well known and, therefore, are not described here in greater detail.

FIG. 4D depicts the deviation between the positioning of a pixel 307 of a certain area of the first digital image and a corresponding pixel 308 in a matching area of the second digital image. The deviation reflects a motion vector whose direction is inverse to the direction of movement of the conversion device. Preferably, the deviation is represented as a set of two numbers (i.e., Mx, and My) that represent the change between the coordinates of a certain pixel 307 in the first digital image and a corresponding pixel 308 in the second digital image.

It should be noted that the motion vector detection process which is depicted in FIG. 4 is only an exemplary process. Many other motion vector detection processes and calculations, including non-SAD methods, may be used in order to generate a motion vector according to two consecutive digital images.

Preferably, a motion vector is estimated for each consecutive pair of images in the sequence of digital images. Accordingly, each digital image of the sequence, except for the first and the last, is used to estimate two sequential motion vectors. Aside from the first and last digital image, every other digital image is used, as a second digital image in which a matching area is looked for, and then as a first digital image in which the matched area is used as a reference for the block matching process, as described above. Preferably, an array that comprises all the estimated motion vectors is calculated and stored as a movement pattern. Preferably, each record in the array is a set of two numeric values (i.e., Mx, and My) that represent the deviation between pixels of the matching areas of the two consecutive digital images.

Figure 4E:
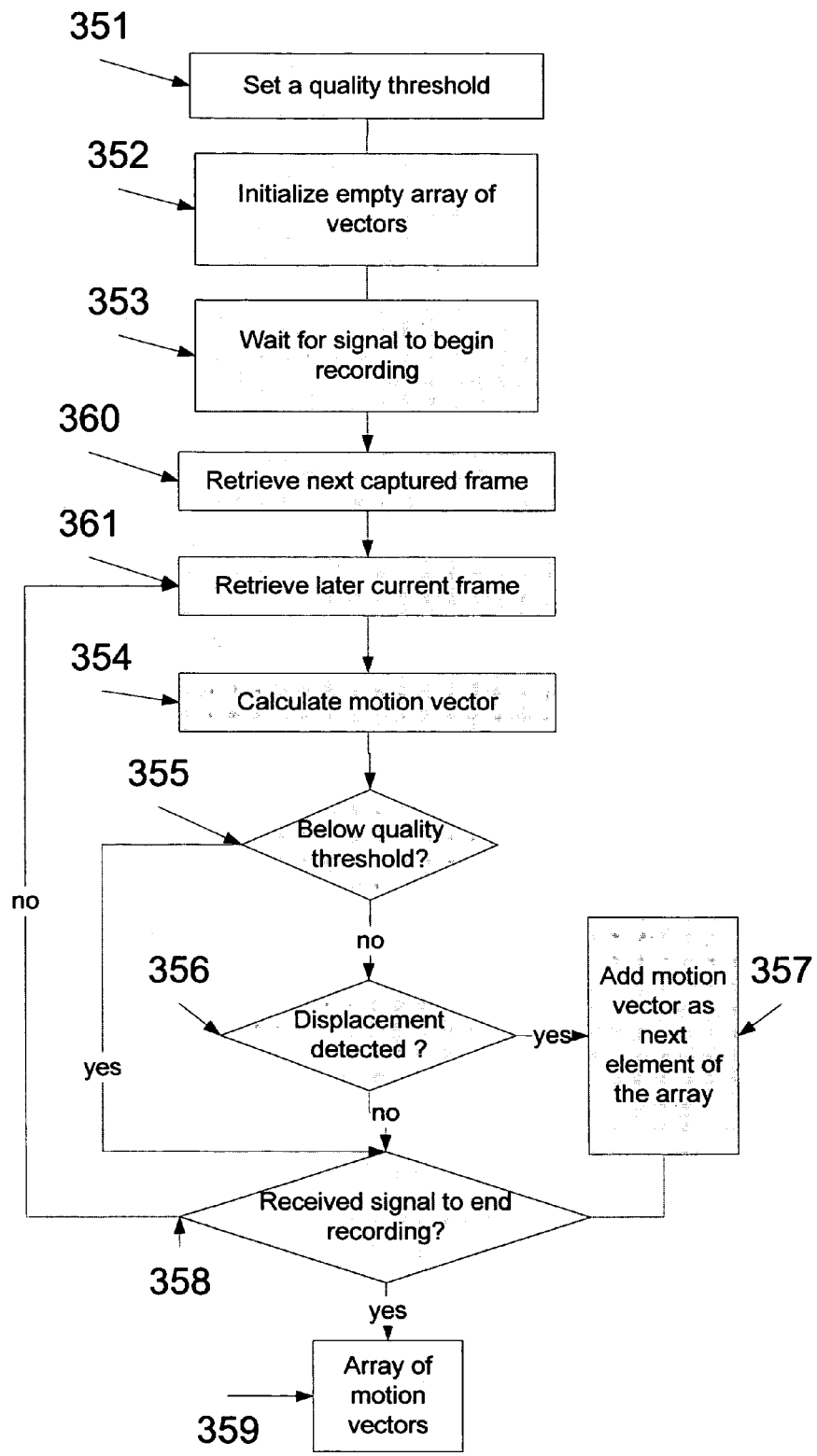
FIG. 4E, is a flowchart that illustrates the generation of a sequence of motion vectors, according to a preferred embodiment of the present invention.

Reference is now made to FIG. 4E, which is a flowchart that illustrates the generation of a sequence of motion vectors, according to a preferred embodiment of the present invention. In the first step of the generation of a sequence of motion vectors, as shown at 351, a quality threshold is set. The quality threshold reflects the estimated quality above which a certain motion vector is defined as a valid motion vector. This ability facilitates the integration of many known algorithms which are used to estimate the validity of the motion vector value, preferably in respect to previous motion vectors. The quality threshold is being used in a later step of the process, as shown at 356.

In the following step, as shown at 352 a motion vector array is initialized. The motion vector array is configured to store an undefined number of motion vectors. Preferably, the array is defined dynamically in a manner that promises flexibility. Then, the process enters a waiting stage in which motion vectors are not recorded until an initiation signal is received, as shown at 353. Preferably, the user has to press a predefined button in order to generate such an initiation signal. After the initiation signal has been received, as shown at 360 and 361, a current frame and a next captured frame are retrieved to allow the calculation of a motion vector. The motion vector is preferably calculated using the current frame and the next captured frame as described in relation to FIGS. 4A-4D. As the process is iterative, a motion vector is preferably calculated for each two consecutive frames by the motion vector generator, as described above, and shown at 354.

In 355, the quality threshold, which has been calculated in a previous step, is now used. If the quality level of the calculated motion vector is below the quality threshold, or the calculated motion vector indicates there was no displacement of the conversion device, as shown at 356, another motion vector is calculated. However, if the quality level of the calculated motion vector is above the quality threshold, and the calculated motion vector indicates there was a displacement of the conversion device, the calculated motion vector is added to the motion vector array, as shown at 357. In the following step 358, the reception of a termination signal is probed. In one embodiment of the present invention, the user can generate a termination signal by pressing a designated button. If no termination signal is received, another motion vector is calculated.

As described above, the additional motion vector is preferably calculated according to differences between the later of the two current frames and an additional frame which is used as a later frame. Therefore, as shown at 361, if the reception of a termination signal has not been probed, the later of the two current frames is forwarded for the calculation of the next motion vector with the next captured frame. As further shown at FIG. 4E, the acquisition of a sequence of motion vectors is a circular process which is calculated in a repetitive manner.

As depicted in FIG. 4E, at the period between the reception of an initiation signal and termination signal, motion vectors are added to the motion vector array in a cyclic manner. Since the user preferably has the ability to generate these signals, as described above, the user can delimit a certain period for recording a certain movement pattern. The process ends when a motion vector array that comprises a sequence of consecutive motion vectors is generated, as shown at 359. The generated sequence represents the certain movement pattern which was performed during the displacement of the conversion device, as described above.

Reference is now made, once again, to FIG. 2 which depicts a sequence of motion vectors 100 which are based on real time digital images taken along a predefined track 102. Each line 104 between two consecutive dots 103 represents a calculated motion vector which is associated with the movement of the conversion device during a certain time segment. FIG. 2 depicts a preferred embodiment of the invention in which the movement pattern 101 has been taken along a predefined track having the shape of the character 'S'.

Reference is now made, once again, to FIG. 3. As described above, a sequence of motion vectors is generated according to the sequential digital images. The next step, as shown at 203, is to match the sequence of motion vectors with one of a number of predefined movement patterns. The sequence of motion vectors is generated according to sequential digital images which have been taken along a certain movement pattern. The user may use the conversion device to input a number of movement patterns. Each movement pattern is used to generate a different control signal. In one embodiment of the present invention, the movement pattern converter comprises a pattern sample repository that comprises pattern sample records; each pattern sample record is associated with a corresponding control signal. Preferably, the number of the pattern sample records is variable and can be adjusted by the user. Each pattern sample record preferably comprises an array of a predefined number, preferably 24, motion vectors. Preferably, if a sequence of spatial motion vectors is acquired, as described above, each pattern sample record comprises a sequence of spatial motion vectors. The motion vectors preferably have a uniform length that preferably can be addressed as a unit. Accordingly, the motion vectors reflect only the directional changes along a related movement pattern. The motion vectors of each array are sequentially arranged according to a certain predefined movement pattern. Such movement patterns may be shaped in the form of common characters, common signs, common symbols, or individually configured markings such as signatures, as described below.

Figure 5A:
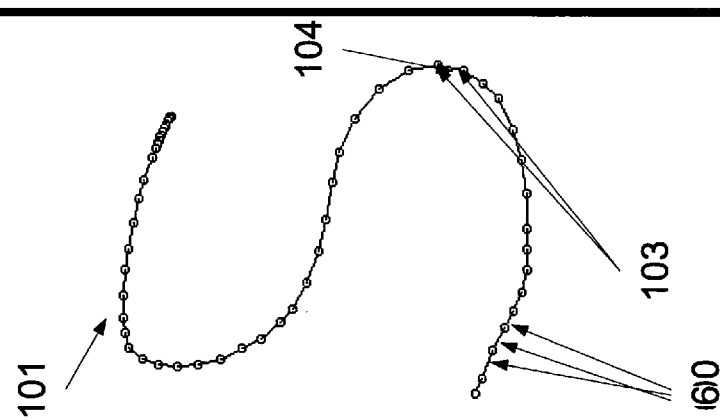
FIG. 5A is an exemplary graphical representation of a sequence of motion vectors that represent a certain movement pattern.
Figure 5B:
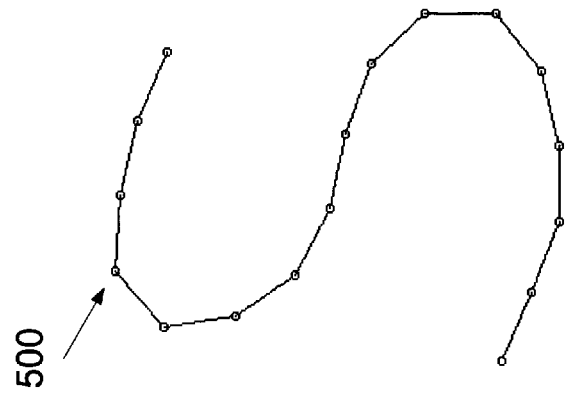
FIG. 5B is an exemplary graphical representation of a sequence of normalized motion vectors, which have been generated according to the sequence of motion vectors of FIG. 5A.
Figure 5C:
FIG. 5C is a graphical representation of an exemplary character, which has a pattern common to the sequence of motion vectors of FIG. 5A and the sequence of normalized motion vectors of FIG. 5B.

Reference is now made to FIGS. 5A, 5B, and 5C which respectively depict a sequence of motion vectors that determine a certain movement pattern 101, a sequence of normalized motion vectors 500 with uniform length, and an exemplary character 501. The graphical representation of a sequence of motion vectors of FIG. 5A is as in FIG. 2 above.

As described above, in one embodiment of the present invention the movement pattern converter comprises a pattern sample repository. Such an embodiment allows the movement pattern converter to match the acquired sequence of motion vectors with one of a number of pattern sample records, each comprising a different predefined movement pattern. However, unlike the pattern sample records that comprise a sequence of predefined motion vectors of uniform length, the acquired sequence of motion vectors comprises an undefined number of motion vectors having different lengths, as depicted in FIG. 2. In one embodiment of the present invention, motion vectors of the acquired sequence are gathered and operated on to form normalized vectors, preferably with a uniform length, before the sequence is compared with the records of the pattern sample repository.

Figure 6A:
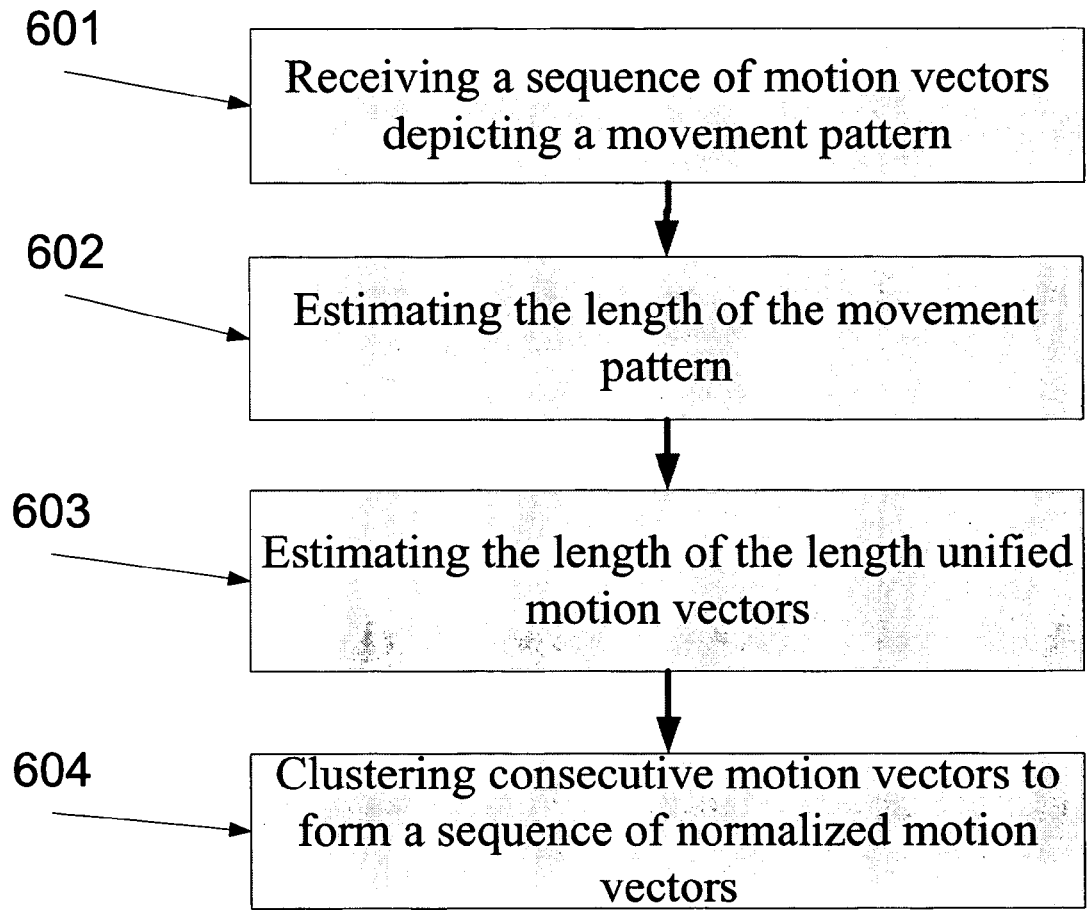
FIG. 6A is a simplified flowchart diagram of a process for generating a sequence of normalized motion vectors, according to a preferred embodiment of the present invention.

Reference is now made to FIG. 6A, which is a flowchart that illustrates a five-step process for generating a normalized sequence of motion vectors, according to a preferred embodiment of the present invention. As further described below the sequence of motion vectors is matched with records that store a sequence of motion vectors that represent a certain movement pattern. These records have a predefined number of motion vectors that comprise a certain movement. In order to match the sequence of motion vectors with the stored records, the sequence of motion vectors have to be segmented according to the predefined number of motion vectors which are stored in these records. Such segmentation allows a matching process, as described in more detail below.

During the first step, 601, a sequence of motion vectors which depicts a movement pattern, as described above, is received. Preferably, the acquired sequence is an array having a number of records, each record comprising a motion vector having a specific length.

During the following step, 602, the length of the movement pattern is estimated. This estimation is done by summing the length of the motion vectors that comprise the acquired sequence. By estimating the length of the movement pattern, the length of the length unified motion vectors can be determined, as shown at 603. The total length of the acquired sequence is preferably divided by a predefined number that represents a required number of motion vectors. As described above, each record of the pattern sample comprises an array having a predefined number of motion vectors, for example as shown at 24. In the next step, as shown at 604, the acquired sequence of motion vectors is divided to length-unified segments motion vectors which are later normalized, before it is matched with each one of the pattern samples. The number of length unified motion vectors is equivalent to the number of motion vectors which are stored in the pattern samples. During the process, the acquired sequence is divided into a similar number of length-unified motion vectors. Preferably, the length of each length-unified motion vector is calculated by dividing the length of the movement pattern into a predefined number of segments which are represented as motion vectors, as described above. The calculated length is stored in order to allow the segmentation of the sequence of motion vectors to groups with equal length, as described below.

As described above, in step 604, after the total length of the acquired sequence motion vector has been estimated according to the total length of the sequence, the acquired sequence of motion vectors may be divided into segments of consecutive normalized motion vectors.

Figure 6B:
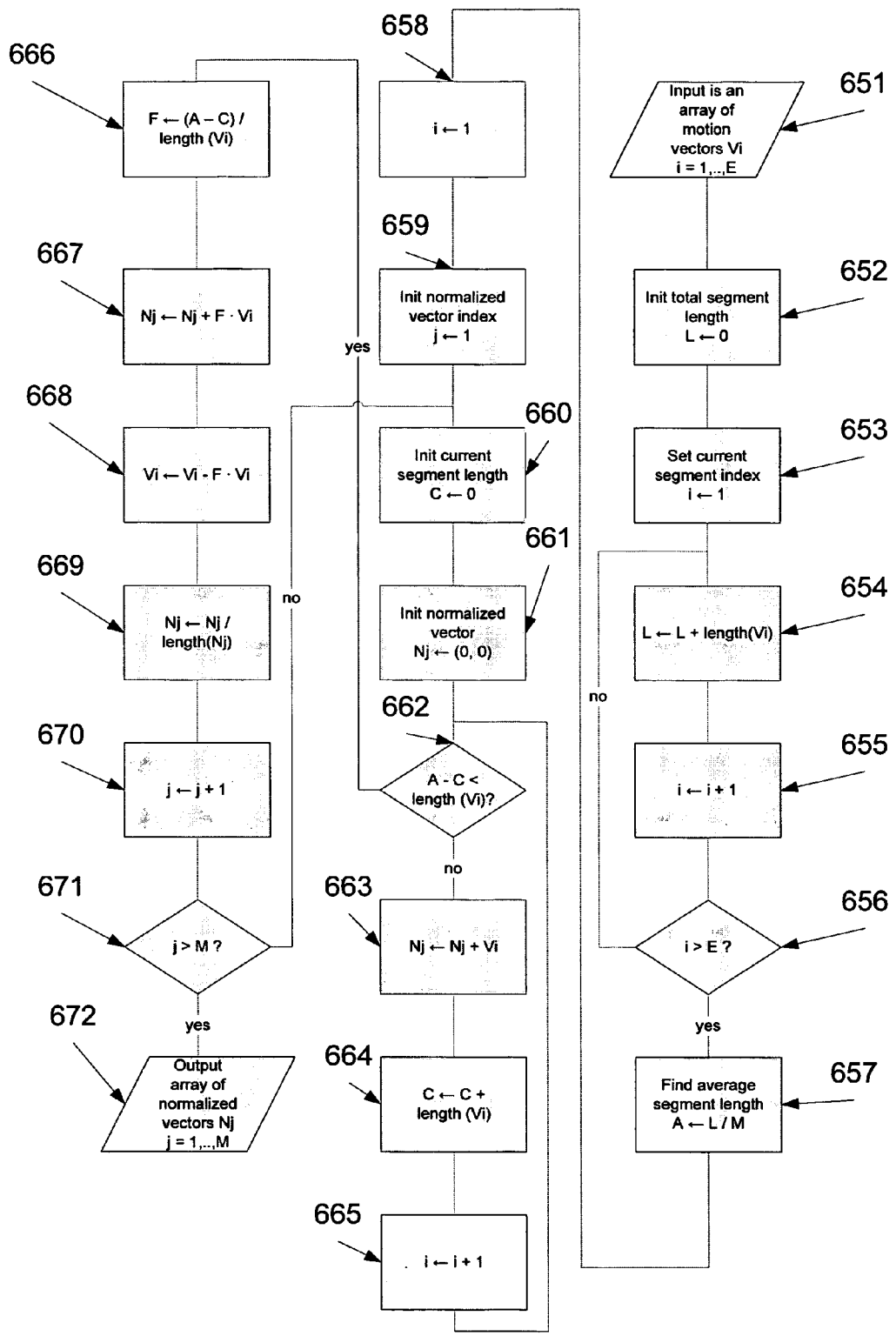
FIG. 6B is another simplified flowchart diagram of the process for generating a sequence of normalized motion vectors, according to a preferred embodiment of the present invention.

Reference is now made to FIG. 6B, which is a flowchart that illustrates in greater detail the normalized motion vector generation process which is depicted in FIG. 6A, according to a preferred embodiment of the present invention. In FIG. 6B j denotes the consecutive order of a current normalized motion vector, i denotes the consecutive order of the current motion vector, E denotes the number of the current motion vectors, L denotes the total length of the current motion vectors, M denotes the number of normalized motion vectors (e.g. 24), N denotes a normalized motion vector, V denotes a current motion vector, A denotes a uniform length of the length unified motion vector, C denotes the current length of the segment of motion vectors forming the current length-unified motion vector, and F denotes the difference between the uniform length (A) and the length of the currently processed normalized motion vector (N(j)).

As shown at 651, initially a sequence of motion vectors, which depicts a movement pattern, preferably stored in an array (V(i)) is received. Preferably, the acquired sequence is an array having a number of records, each record comprising a motion vector having a specific length. After the sequence of motion vectors has been received, the length of the movement pattern is estimated. As depicted in steps 652 to 657 the length estimation is done by summing the length of the motion vectors that comprise the acquired sequence. As shown at steps 654 to 656, the summing is done in an iterative process in which the lengths of all the motion vectors are summed together into a single variable (L). As shown at 657, after the length of the movement pattern has been estimated, the total length (L) of the acquired sequence is divided by a predefined number that represents a required number of motion vectors (M). The outcome of this deviation (A) is a uniform length according to which the sequence of motion vectors is segmented to form normalized motion vectors, as described in steps 662 to 669. Now, as shown at steps 658 to 659 different variables which are used in the normalized motion vector generation process are reset. Then, as shown at steps 660 to 671, sub-process in which a normalized motion vector is generated according to the uniform length (A) determined in step 657. This sub-process is iterative and allows the generation of consecutive normalized motion vectors, as described below. During each one of the iterations of the sub-process, variables that represent the currently processed motion vector are initialized. Preferably, the currently processed normalized vector N(j) and the variable C that denotes its current length are initialized, as respectively shown at 661 and 660. Then, as shown at steps 662 to 665 a number of consecutive motion vectors are added to form the currently processed normalized motion vector N(j). The consecutive motion vectors are continuously added as long as the sum of their lengths does not exceed the uniform length A, as shown at 662. Accordingly, by connecting the following consecutive motion vector the segment which is currently processed is extended beyond the estimated uniform length (A). In order not to exceed the estimated uniform length (A), the gap between the length of the connected consecutive motion vectors that comprise the segment and the normalized length (A-C) is completed by a portion of a consecutive motion vector F·V(i), as shown at steps 666 and 667. As shown at 668, the rest of the consecutive motion vector is added as the first vector that comprises the following normalized vector, N(j+1), which is processed during the following iteration of the process (j+1). Preferably, as shown at 669, after the length of the last motion vector or a portion thereof was added, the new segment (N(j)) is being normalized to a uniform unit size (N(j)=N(j)/Length(N(j))), as further described below. As shown at 671, the iterative sub-process which is shown at steps 660 to 671 continues until the last motion vector has been allocated to the last segment. Accordingly, as shown at 672, during the normalized motion vector generation process a sequence, preferably an array, of normalized vectors is generated. Unlike motion vectors of the acquired sequence of motion vectors, the normalized motion vectors of the sequence of normalized motion vectors have uniform length. After the uniform motion vector generation process has ended, the sequence of normalized motion vectors may be directly compared with a number of potential pattern sample records. FIG. 5B depicts a graphical representation of such a sequence of uniform motion vectors.

During the normalized motion vector generation process each motion vector is normalized by dividing by the motion vector length (N(j)=N(j)/Length(N(j))). In particular, this part of the normalization is preferably defined according to the following equations:

$$x'=x/\sqrt{(x^2+y^2)};$$

$$y'=y/\sqrt{(x^2+y^2)};$$

where (x', y') denotes a normalized motion vector and (x, y) denotes a motion vector length unified before it has been normalized. After the motion vectors have been normalized as described above, the differences between them and the motion vectors of the pattern sample records preferably reflect only an angular deviation. The vectors are normalized to unit length (1) in this example as described hereinabove and in FIG. 4E.

Figure 8A:
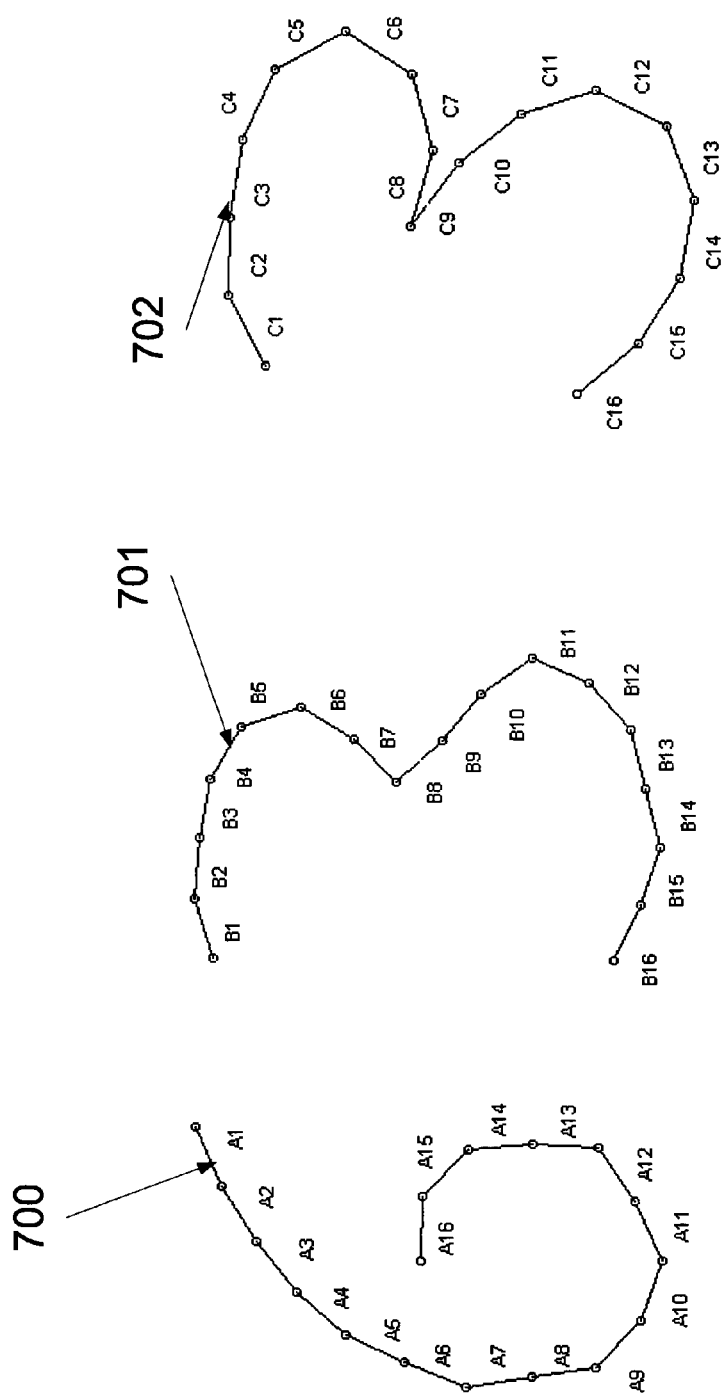
FIG. 8A is a graphical representation of a sequence of normalized motion vectors which has been generated according to a sequence of digital images taken along a movement pattern shaped as the numeral "3" and a pair of pattern sample records which are configured to be matched with movement patterns shaped as a "3" and a "6" respectively.

Reference is now made to FIGS. 8A and 8B, which respectively depict graphical and numeric representations of three sequences of normalized motion vectors, according to a preferred embodiment of the present invention. As described above, the sequence of motion vectors has been normalized, the sequence of normalized motion vectors may be directly compared with a number of potential pattern sample records.

As described above, each pattern sample record comprises a predefined number of normalized motion vectors.

Preferably, in order to evaluate whether a certain pattern sample record matches a sequence of normalized motion vectors, a set of correlation values is calculated. Each correlation value of the set represents a similarity level value that reflects the similarity between a normalized motion vector (x', y') and a corresponding motion vector of the evaluated pattern sample record (Px, Py). Since, preferably, both motion vectors are normalized in the same manner, the differences between the motion vectors reflect only the angular deviation between them. Preferably a similarity level value (SLV) is calculated as a correlation value. The SLV is preferably defined according to the following equation:

$$SLV=(x'·Px)+(y'·Py)$$

Figure 7:
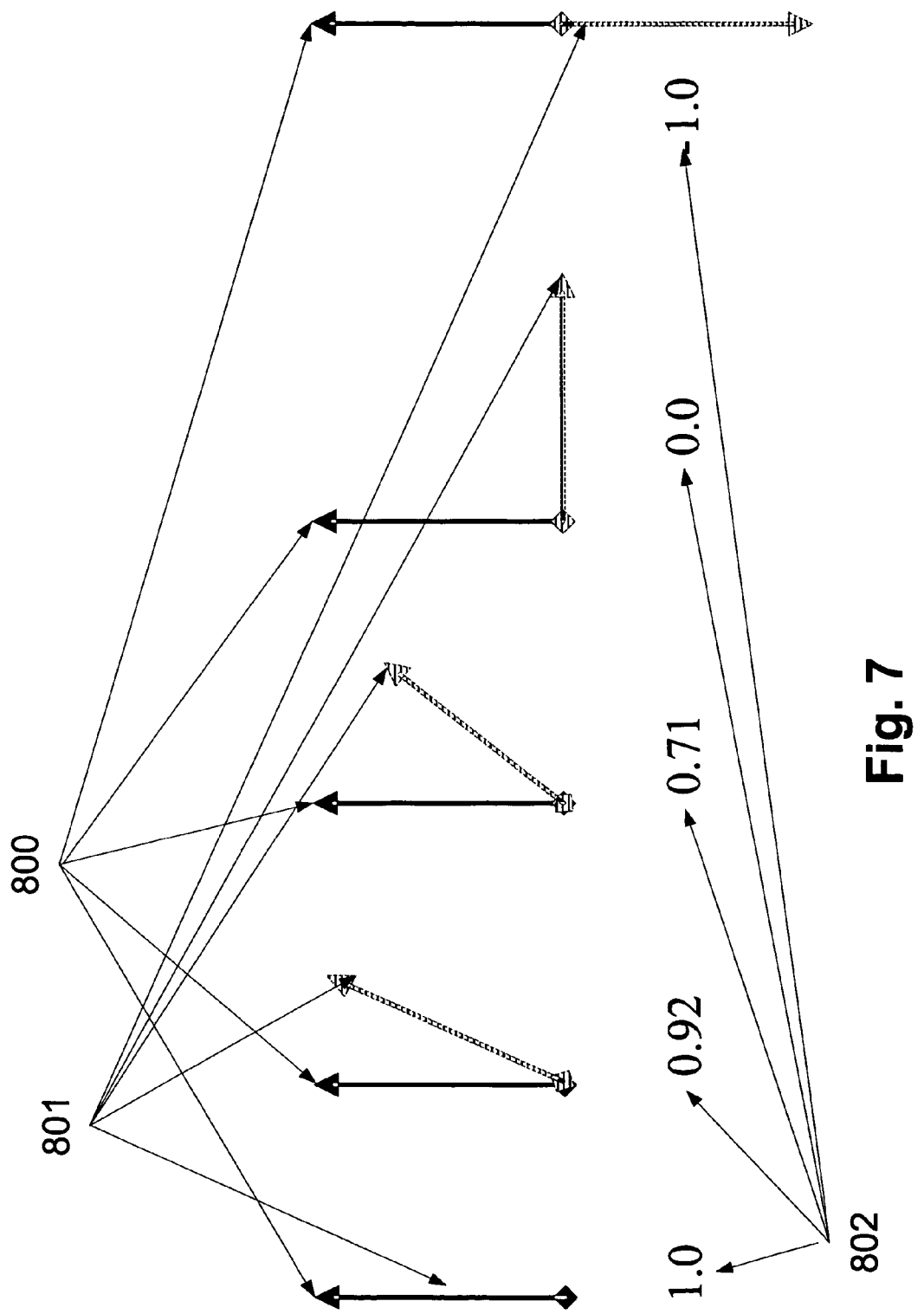
FIG. 7 is an exemplary graphical representation of a set of exemplary normalized motion vectors and a set of corresponding motion vectors.

Since both the motion vector (x', y') and the pattern sample record (Px,Py) are normalized, the similarity level values are between –X and X, where X represents the highest similarity level and –X represents the lowest similarity level. X is preferably equal to 1. FIG. 7 is a graphical representation of a set of exemplary normalized motion vectors 800 and corresponding motion vectors 801. As depicted, the similarity level values 802 correspond to the angular deviation between each normalized motion vector 800 and its respective corresponding motion vector 801.

As described above the sequence of motion vectors defines a certain pattern movement. The motion vectors are arranged in a consecutive order that reflects the sequential digital images which have been taken during the displacement of the conversion device along a certain track. Any movement pattern track follows one or more lines, as shown at numeral 102 of FIG. 2. Thus, in order to generate a stream of sequential digital images that follows a certain movement pattern, the conversion device may be displaced along the track of the movement pattern.

Preferably, the similarity level value of all the motion vectors that define a certain pattern sample record are summed to yield a match score that reflects the similarity level of the pattern sample record in relation to the sequence of normalized motion vectors.

FIG. 8A depicts a sequence of normalized motion vectors which has been generated according to sequential digital images taken along a movement pattern 702 shaped as a "3." The figure further depicts two exemplary pattern sample records which are configured to be matched with a sequence of normalized motion vectors. One exemplary pattern sample record 701 is configured for a movement pattern shaped as a "3" and another exemplary pattern sample record 700 is configured for a movement pattern shaped as a "6."

FIG. 8B depicts two tables 703 and 704, each comprising similarity level values of different pattern sample records in relation to the normalized motion vector movement pattern 702. The table 704 at the left comprises similarity level values of the pattern sample record which is configured for a movement pattern 700, which is shaped as a "6," and the table 703 at the right comprises similarity level values of the pattern sample record which is configured for a movement pattern 701, which is shaped as a "3." Clearly, since the sequence of normalized motion vectors represents a movement pattern shaped as a "3," its vectors are similar to the vectors of the pattern sample record which is configured for movement pattern 701. The match score of the pattern sample record which is configured for movement pattern 703 is substantially higher than the match score of the other pattern sample record, for movement pattern 704.

In one embodiment of the present embodiment all the match scores of all pattern sample records are calculated. Based upon the calculations of the match scores, the pattern sample record that has the highest match score is chosen as a match to the sequence of normalized motion vectors. In another embodiment, a matching threshold is predefined. If a pattern sample record has a match score higher than the matching threshold, the pattern sample record is chosen and the match scores of other pattern sample records are not calculated.

The matching threshold may also be used as a means to avoid erroneous matching. As described above, the pattern sample record having the highest match score is chosen as a match to the sequence of normalized motion vectors. By implementing such an embodiment, a random movement pattern which is not defined, or is approximately defined at any pattern sample, may be chosen as a match to the sequence of normalized motion vectors only because it has the highest match score. Hence, in order to avoid such an erroneous match, a matching threshold that determines the minimum match score may be used. Preferably, the movement pattern converter outputs an error message that indicates that an error has occurred and, preferably, the match score or type of error.

As described above, the movement pattern converter comprises a pattern sample repository. Each pattern sample record is configured to be matched, as described above, with a corresponding movement pattern. Each pattern sample record is associated with a control signal. In one embodiment of the present invention the pattern sample repository comprises pattern sample records which are configured to be matched with movement patterns of all the characters which are available on a common keyboard. In such an embodiment, the control signals of the pattern sample may be used as control signals of a keypad or a keyboard of the conversion device. The displacement of the conversion device along a movement pattern track generates a notification of that event which is sent to a program which is currently active on the memory of the conversion device.

When a sequence of spatial motion vectors is calculated, as described above, spatial movement patterns may be matched to generate a control signal. In such an embodiment, each pattern sample record is configured to be matched, as described above, with a spatial movement pattern.

In one embodiment of the present invention the conversion device further comprises a communication interface module that facilitates the transmission of the control signals to a designated destination. For example, a cellular transmitter may be used to send the control signals to a remotely located device. Other transmitters, such as radio frequency (RF) transmitters, may used to transmit the control signals. For example, Wi-Fi or other-standards for wireless local area networks (WLAN) based on the IEEE 802.11 specification transmitters may be used to transmit the control signals. Bluetooth®, a standard for short-range digital transmission, can be used as a communication protocol for the RF communication. The conversion device may also be wired to another remotely located device. The wire connection preferably provides wired serial communication. The serial communication may include an RS-232 connection, an Ethernet connection, a Universal Serial Bus (USB) connection, a cellular transceiver connection, a Firewire connection, a USB2 connection, a Bluetooth® connection or an IR connection. Preferably, the USB or the USB2 connection can be used as a power supply, supplying electrical current to the conversion device.

However, since the control signals are chosen according to a match between the sequence of normalized motion vectors and predefined pattern samples, the conversion device cannot identify movement patterns which are not represented by one of the pattern sample records.

Reference is now made to FIG. 9, which depicts schematic illustrations of a mobile phone and some of its displays during the learning mode, which is a process involving recording of movement patterns into the pattern sample repository and during the usage of the recorded movement pattern. In one embodiment of the present invention, the movement pattern converter comprises a movement pattern learning unit. The movement pattern learning unit is configured to allow a user to configure the records of the pattern sample repository during a learning mode. The learning mode is similar in many ways to the gesture recognition process. The pattern sample records are configured to be matched with sequential digital images which have been taken along an individually configured movement pattern. The configuration of the pattern sample records during the learning mode is done in the same manner that a sequence of normalized motion vectors is generated. This generation process is described in relation to FIG. 4E, FIG. 6A and FIG. 6B.

Preferably, a user configures one of the pattern sample records by capturing sequential digital images taken by displacing the conversion device along a new movement pattern or by reassociating a pattern sample record with a different telephony function.

During the learning mode the configuration is done by converting the captured sequential digital images to a corresponding sequence of motion vectors which is stored in a pattern sample record. As described above, the corresponding sequence of motion vectors are generated in the same manner that a sequence of normalized motion vectors is generated. The user further associates a related control signal with the pattern sample record. FIG. 9 depicts an exemplary learning process during which, the conversion device is a mobile phone 900 with an integrated camera in a learning mode. In FIG. 9 a user uses the movement pattern learning unit to configure a 'C'-shaped movement pattern 901 with a control signal that actuates the mobile phone to initiate a calculator session. As shown at 902, in order to assign the 'C'-shaped movement pattern, the user maneuvers the mobile phone along a 'C'-shaped movement path. Than, as shown at 903, the mobile phone screen 904 displays a menu that allows the user to assign the movement pattern with a certain function. In this step, a new pattern sample record is assigned and associated with the 'C'-shaped movement pattern. In the following step, as shown at 905, the mobile phone screen 904 displays a confirmation message that indicates the reception of the new pattern sample record. The new pattern sample record allows users to use the 'C'-shaped movement pattern 901 as a shortcut for accessing the calculator function of the mobile phone, as shown at 905 and 906 by repeating the C gesture and comparing the stored and sample gestures as described hereinabove. The recorded sequence of motion vectors that represent the movement pattern is preferably converted to a sequence of normalized motion vectors with a uniform length. The conversion process is preferably identical to the aforementioned conversion process. It should be noted that any other telephony function can be associated with any of the pattern sample records. For example, a control signal that tells the mobile telephone to make a call to a certain number is associated with one of the pattern sample records.

As described above, the reception of a sequence of motion vectors may be accompanied by a command to identify the gesture. This initiates the matching process in order to match a pattern sample record. The pattern sample record may be associated with any function of the telephone. Accordingly, any function of the telephone may be performed, as a reaction to and correlated with the performance of the gesture. During the aforementioned learning mode such a sequence of motion vectors or gestures may be associated with any function of the telephone.

Preferably, the movement pattern learning unit is used to reassociate a predefined movement pattern of a certain pattern sample record. A user may, for example, reassociate an 'S'-shaped predefined movement pattern which is used for indicating typing the letter 'S' as a turn off instruction that instructs the conversion device to shutdown.

Preferably, the conversion device is coupled to a display device and a viewing module. The viewing module is configured to output a graphical user interface (GUI) to a display device that displays a user input interface. Preferably the user input interface allows a user to associate a certain control signal with a new pattern sample record. The associated control signal is chosen by using the user input interface to input or select a function of either the conversion device or one of the applications which is hosted thereby. Preferably, the user input interface allows the user to input movement patterns by using an MMI which is integrated with the conversion device, thereby interfacing with the movement pattern converter. The user may use the MMI to draw a new movement pattern and to store it as a pattern sample record. As is generally well known, a common pointing device such as a roller and a common textual input device such as a keypad, both connected to the conversion device, can allow a user to input information and to make selections. The means of displaying the interface on the base of the graphical user interface is well known and, therefore, will not be described here in detail.

Preferably, the pattern sample records may be updated or added from an external source. In one preferred example a designated application allows the user to generate or edit pattern sample records using a hosting computing unit, such as a personal computer. The designated application preferably comprises a drawing editor which is configured to allow the user to draw a movement pattern and to store it as a pattern sample record. The drawing is preferably done using a regular mouse. The stored pattern sample records are preferably transmitted to the mobile phone in order to update pattern sample records which are stored locally on his repository, as described above.

In one embodiment of the present invention the user uses the movement pattern learning unit to input a security signature. Such a security signature may be used for verifying an individual's eligibility to receive specific categories of information. The security signature is preferably associated with a control signal that facilitates access to certain data or allows certain restricted functions. For example, in one embodiment of the present invention, the conversion device is a mobile phone with an integrated camera and the security signature is used for authenticating a user's eligibility to make or receive a call. The security signature may be a spatial or a planar movement pattern.

It is expected that during the life of this patent many relevant devices and systems will be developed and the scope of the terms herein, particularly of the terms control signals, wireless, and image sensors, are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device having a connection to an image sensor for identifying predefined complex self-motions, comprising:
   a motion vector detection module adapted to receive digital images captured during a displacement of said image sensor, said motion vector detection module being configured for generating a current motion vector of said image sensor according to said digital images;
   an amalgamating module adapted to receive said current motion vector, said amalgamating being configured to amalgamate said current motion vector with a sequence of consecutive motion vectors during said displacement;
   a movement pattern repository adapted to store a plurality of pattern sample records, each represents a predefined movement pattern; and
   a movement pattern matching module adapted to match between one of said plurality of pattern sample records and said sequence of consecutive motion vectors.

2. The device of claim 1, wherein said predefined movement pattern is a non-linear movement pattern.

3. The device of claim 1, wherein said movement pattern matching module is configured to determine according to said match whether said digital images are taken approximately along respective predefined movement patterns.

4. The device of claim 1, wherein said amalgamating module is adapted to be used for adding a new record to said plurality of pattern sample records, said new record being generated according to said digital images.

5. The device of claim 1, further comprising a user interface, said user interface being configured to allow a user to initiate and terminate the capturing of said digital images.

6. The device of claim 1, further comprising an output adapted to output a control signal based on said matching.

7. The device of claim 5, said control signal represents at least one of the following group: a telephone function, a character for textual input, the initiating of at least one function of said device, a security signature having a planar pattern, a security signature having a spatial pattern, and the termination of at least one function of said image input device.

8. The device of claim 3, wherein each one of said plurality of pattern sample records comprises an array of motion vectors.

9. The device of claim 7, wherein said amalgamating module is adapted to convert said sequence of consecutive motion vectors to a normalized sequence of consecutive normalized motion vectors, each normalized motion vector of said normalized sequence and each vector of said array of motion vectors have a uniform length.

10. The device of claim 1, wherein said device is one of the following group: a mobile phone, a Personal Digital Assistant (PDA), and a laptop.

11. The device of claim 1, wherein said image sensor is one member of the following group: a complementary metal oxide semiconductor (CMOS) sensor, and a charged coupled portable autonomous device (CCD) sensor.

12. The device of claim 1, wherein said digital images are represented by one member of the group consisting of: Hue-Saturation-Value(HSV) color coordinates, CIE L*a*b*

(CIELAB) color coordinates, YCbCr color coordinates, and Red-Green-Blue (RGB) color coordinates.

13. The device of claim 1, wherein said connection is configured to allow a user to maneuver said image sensor separately from said device.

14. The device of claim 12, wherein said connection comprises at least one of the following connections: an RS-232 connection, an Ethernet connection, an Universal Serial Bus (USB) connection, a cellular transceiver connection, a Firewire connection, an USB2 connection, a Bluetooth® connection, and an IR connection.

15. The device of claim 1, wherein said image sensor is firmly coupled to said device.

16. The device of claim 5, further comprising a communication interface module, said communication interface module being adapted to transmit said control signal to a remotely located device.

17. A device for converting digital images taken during the displacement of an image sensor to a control signal, comprising:
- an image input device having a connection to a image sensor, said image input device adapted to receive said digital images captured during the displacement of said image sensor;
- a repository of predefined movement patterns; and
- a movement pattern converter, associated with said repository and said image input device, adapted to convert said digital images to said control signal according to a match between said displacement and one of said predefined movement patterns.

18. The method of claim 17, further comprising a step d) of generating a control signal according to said match.

19. The method of claim 17, wherein said matching of step (c) is performed by matching said sequence of movement data with a plurality of pattern sample records, each record of said pattern sample records being associated with a different predefined movement pattern.

20. The method of claim 17, wherein said predefined movement pattern is one of the following group: a character, a symbol, a predefined outline of a hand gesture, a security signature having a pattern, and a security signature having a spatial pattern.

21. The method of claim 17, wherein said movement data comprises information regarding the movement of said image sensor integrated device during consecutive time segments.

22. The method of claim 17, wherein said sequence of movement data is an array of motion vectors.

23. The method of claim 21, wherein each record of said plurality of pattern samples comprises an array of motion vectors, wherein during said matching each motion vector of said sequence of movement data is matched with a corresponding motion vector of said plurality of pattern sample records.

24. The method of claim 22, wherein during said matching the motion vectors of said sequence of movement data are segmented according to the number of motion vectors stored in the matched predefined movement pattern.

25. The method of claim 21, further comprising a step between said step (a) and said step (b) of normalizing said sequence of movement data by dividing each one of said array of motion vectors by its length.

26. The method of claim 24 further comprising a step of dividing said sequence of movement data into a predefined number of segments of equal length, each one of said segments representing directional data of a corresponding digital image of said sequence.

27. The method of claim 17, further comprising a step between said step (a) and said step (b) of converting the color coordinates of pixels of said digital images to grayscale color coordinates.

28. The method of claim 6, further comprising a step of transferring said control signal to an application of said device.

29. The method of claim 27, wherein said application is hosted on said device.

30. The method of claim 27, wherein said application is hosted on a remotely located device.

31. The method of claim 17, further comprising a step before said step (a) of storing at least one predefined movement pattern.

32. The method of claim 30, wherein said storing comprises a step of receiving digital images captured during the displacement of said image sensor integrated device approximately along one of said at least one predefined movement pattern.

33. The method of claim 30, wherein said storing comprises a step of receiving said at least one predefined movement pattern from an external source.

34. The method of claim 32, wherein said external source is a personal computer.

35. A mobile phone having an image sensor for identifying predefined complex self-motions, comprising:
- a motion vector detection module adapted to receive digital images captured during a displacement of said image sensor, said motion vector detection module being configured for generating a current motion vector of said image sensor according to said digital images;
- a movement pattern repository for storing a plurality of user defined movement patterns; and
- a movement pattern matching module adapted to match between one of said plurality of user defined movement pattern records and said sequence of consecutive motion vectors.

36. The mobile phone of claim 34, wherein said movement pattern is predefined by a user of said mobile phone.

37. The method of claim 36, further comprising a step between step b) and step c) of matching said user defined movement pattern with a stored predefined movement pattern, wherein said performing of step c) is done according to said match.

* * * * *